United States Patent [19]

Stotler et al.

[11] Patent Number: 4,955,714

[45] Date of Patent: Sep. 11, 1990

[54] SYSTEM FOR SIMULATING THE APPEARANCE OF THE NIGHT SKY INSIDE A ROOM

[76] Inventors: James G. Stotler, 16 SE. 50th Ave., Portland, Oreg. 97215; Dennis G. Lowe, 3610 NE. 113th, Portland, Oreg. 97220

[21] Appl. No.: 879,155

[22] Filed: Jun. 26, 1986

[51] Int. Cl.$^5$ .............................................. G03B 21/00
[52] U.S. Cl. ..................................... 353/62; 434/286; 353/44; 353/122
[58] Field of Search ................... 353/62, 121, 122, 44, 353/28, 82, 85, 87, 89, 119; 434/285, 286, 287, 84, 88; 272/8 P, 10; 200/86.5; 362/97

[56] References Cited

U.S. PATENT DOCUMENTS

| | | | |
|---|---|---|---|
| 301,232 | 7/1884 | Hartsough | 353/44 |
| 988,471 | 4/1911 | Jones | 434/286 |
| 2,313,166 | 3/1943 | Nicholas | 200/86.5 |
| 2,477,027 | 7/1949 | Wenberg | 434/286 |
| 2,632,359 | 3/1953 | Spitz | 434/286 |
| 2,763,183 | 9/1956 | Liversidge | 434/286 |
| 3,312,142 | 4/1967 | Shistovsky | 434/286 |
| 3,470,629 | 10/1969 | Kittredge et al. | 434/286 |
| 3,880,508 | 4/1975 | Hughes | 353/44 |
| 4,403,964 | 9/1983 | Meier | 353/62 |
| 4,457,717 | 7/1984 | Chika | 434/88 |

Primary Examiner—William A. Cuchlinski, Jr.
Assistant Examiner—Patrick R. Scanlon
Attorney, Agent, or Firm—Dellett, Smith-Hill and Bedell

[57] ABSTRACT

A system for painting images of stars and other objects on the interior surfaces of a room with phosphorescent paint utilizes a projector to project symbols on the surface to indicate locations of points to be painted. The projector is adjustable to accomodate rooim size and position of the viewer.

10 Claims, 3 Drawing Sheets

SYSTEM FOR SIMULATING THE APPEARANCE OF THE NIGHT SKY INSIDE A ROOM

BACKGROUND OF THE INVENTION

The present invention relates to a method of interior decoration and more particularly to a system for simulating the appearance of the night sky inside a room.

Gazing at the stars is an enjoyable experience for many people but is usually limited to the out-of-doors. Of course, the appearance of the night sky can be simulated in a darkened room. Planetariums have long used projectors to project light spots on the interior surface of a domed room, the light spots being arranged in the same way that stars are arranged in the heavens. A planetarium projector mounted in the center of the room typically consists of a hollow sphere containing a strong light source, the sphere being perforated with holes or containing lenses so that the light from the source images onto the interior surface of the domed room. The holes are arranged on the sphere so that the projected light spots are properly positioned to give a viewer in the room the impression of stars in a night sky arranged to form familiar constellations.

In such a planetarium, as a viewer moves away from the projector toward the periphery of the domed room, the projected constellations begin to appear slightly distorted, particularly the constellations on the part of the dome nearest the viewer due to the angle at which the viewer sees the projection. However such distortion is minimized by the domed shape of the room to the point where it is usually not noticeable unless the viewer is very close to the edge of the room.

When a similar projector is utilized to reproduce the image of the night sky in a conventional room having flat walls, the arrangement of the stars may be quite accurate from the point of view of the projector but the apparent distortion in the relative positioning of the stars and in the shapes of constellations is quite apparent to a viewer only a short distance from the projector due to a difference in angle at which the projections are viewed. As an illustration of this distortion effect, a square drawn on paper looks like an elongated rectangle when viewed from a point other than directly above the paper. A homeowner might wish, for example, to utilize a planetarium projector to reproduce the night sky in a bedroom so that he can "gaze at the stars", but in order for him to see the stars accurately arranged, he would be faced with the prospect of sharing the bed with the projector.

The appearance of the night sky can also be simulated by painting the interior surfaces of a room with spots of phosphorescent paint, the paint spots being arranged to mimic the arrangement of stars in the sky. The result can be striking, but the arrangement of stars created utilizing this phosphorescent paint spot method can accurately mimic the arrangement of the sky only from one point of view in the room. However the problem of a viewer having to share such viewpoint with a bulky projector is eliminated. Unfortunately it is very difficult and time consuming to properly position the paint spots to simulate known constellations with respect to a particular point of view in a room. What would be desirable is a system for easily and accurately determining where the paint spots are to be located.

SUMMARY OF THE INVENTION

According to one aspect of the invention, interior surfaces of a room are painted with spots of phosphorescent paint, the spots being arranged to mimic the arrangement of stars in one portion of the night sky. In order to insure that the paint spots are correctly arranged from a particular viewpoint in the room, a projector comprising a light source surrounded by a metal sphere is placed at that particular viewpoint before the paint spots are applied. Light from the light source passes through holes or apertures in the upper portion of the sphere and forms light spots on the surfaces of the room. The holes in the sphere are arranged so that the light spots fall in the appropriate places where the paint spots are to be located. A workman then paints the light spots with the phosphorescent paint. Thus a workman may create an accurate simulation of the night sky in a room using phosphorescent paint spots without having to manually determine where each paint spot should be placed.

According to another aspect of the invention, the position of the light source within the projector is adjustable along the vertical axis of the sphere so that when the light source is moved upward within the sphere, the pattern of light spots produced by the projector expands without otherwise substantially distorting the relative positioning of light spots within the projected pattern. Conversely, when the light source is moved downward the pattern shrinks. The ability to expand or shrink the light spot pattern enables a workman to adjust the "horizon" of the painted night sky image (i.e., the elevation of the lowest stars) to account for differences in room height or width. In a wide room or a room with a low ceiling, the light source is adjusted to a higher vertical position than in a narrow room or a room with a high ceiling, in order to produce the same horizon.

According to yet another aspect of the invention, the projector sphere is mounted on a tripod having legs of independently adjustable length so that the projector can be tilted in any direction by unequally adjusting the length of the legs. Tilting the projector changes the vertical orientation of the projected night sky image, and such tilting is desirable when the point from which the night sky image is to be viewed is near a wall. If the night sky image were not tilted away from the wall, nearly half the image would be compressed onto the wall behind the viewer and normally would not be seen.

It is accordingly an object of the invention to provide a system for simulating the image of the night sky within a darkened room.

It is another object of the invention to provide an easy to use system for indicating the positioning of phosphorescent paint spots to be painted on the interior surfaces of a room of any shape or dimension so that from one location in the room the paint spots appear to be arranged in the same relative order as stars in the night sky.

The subject matter of the present invention is particularly pointed out and distinctly claimed in the concluding portion of this specification. However, both the organization and method of operation of the invention may best be understood by reference to the following description taken in connection with accompanying drawings wherein like reference characters refer to like elements.

DETAILED DESCRIPTION

Figure 1:
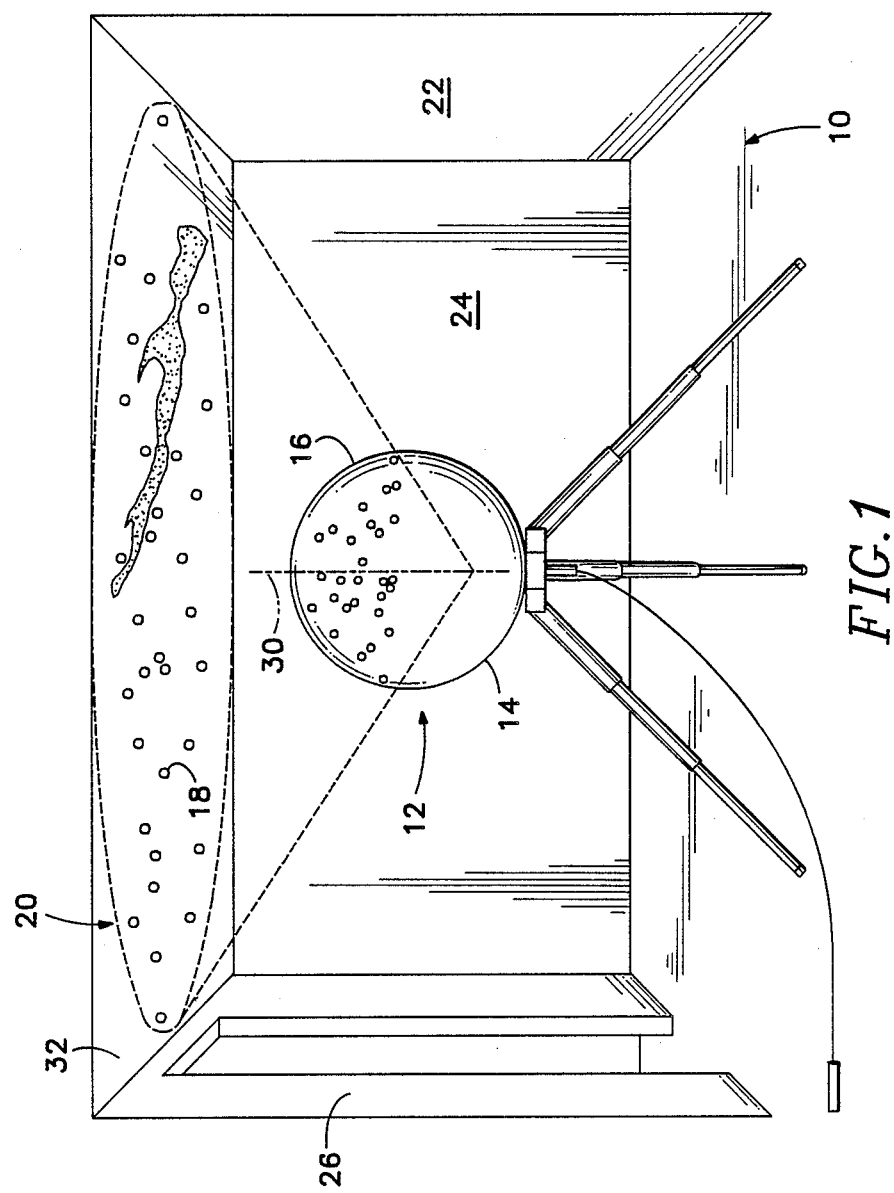
FIGS. 1 and 2 are perspective views of a projector according to the present invention positioned in a room.

Referring to FIG. 1, an image of the night sky is simulated in a darkened room 10 by painting the interior surfaces of the room with spots of phosphorescent paint which glow in the dark but which are substantially transparent in daylight. The paint spots are arranged to mimic the relative positioning of stars in known constellations of the night sky from one particular point of view in the room. To insure that the paint spots are correctly arranged, a projector 12 comprising a light source (not shown) surrounded by a metal sphere 14 is placed at that particular point in the room before the paint spots are applied. The light from the light source passes through holes or apertures in an upper hemisphere 16 of sphere 14 and forms light spots (such as spot 18) on inner surfaces of the room 10, the holes in hemisphere 16 being arranged so that the light spots fall on surfaces of the room in positions where the paint spots are to be located. A workman then paints the light spots with phosphorescent paint.

The appropriate positioning of the holes in projector hemisphere 16 is substantially independent of the size or shape of the room or of the position of projector 12 in the room and can easily be determined from readily available astronomical globes which show the positions of stars with respect to the Earth. Once the holes are properly positioned in hemisphere 16, the projector 12 may be placed in any location in any room and the resulting light spots will correctly indicate the positioning of the paint spots so that the paint spots accurately mimic the arrangement of stars in the night sky from the point of view of an observer positioned where the projector was located. Thus a workman may create an accurate image of the night sky with respect to nearly any viewpoint in any room using phosphorescent paint spots without having to manually determine where each paint spot should be placed. However, since the arrangement of the paint spots is accurate only from one point of view in the room, the center of projector 12 should be carefully positioned. For example in a bedroom, a viewer may wish to "gaze at the stars" while lying in bed, so the projector 12 should be placed at the point where the viewer's head is to be positioned.

The viewer may wish to view the stars in a partially darkened room. This can be accomplished by painting the resulting light spots with fluorescent paint which glows even in a lighted room when exposed to an ultraviolet light source.

It is desirable for light spots near the periphery of the pattern 20 of light spots produced by projector 12 to strike partway down the walls 22, 24 and 26 of room 10 so that when the light spots are painted, the "horizon" (i.e., the elevation of lowest visible "stars") of the resulting night sky image is relatively low, thereby giving the impression of viewing the stars from an open plane rather than from a deep valley. Accordingly the position of the light source in projector 12 is adjustable along a vertical axis 30 of sphere 14. When the light source is moved upward within the sphere 14, the pattern 20 of light spots produced by the projector 12 expands. Conversely, when the light source is moved downward within the sphere, the pattern of light spots contracts. In FIG. 1, the light source may be considered as positioned incorrectly within sphere 14 because the light spot pattern 20 is concentrated on the ceiling 32 of room 10.

Figure 2:
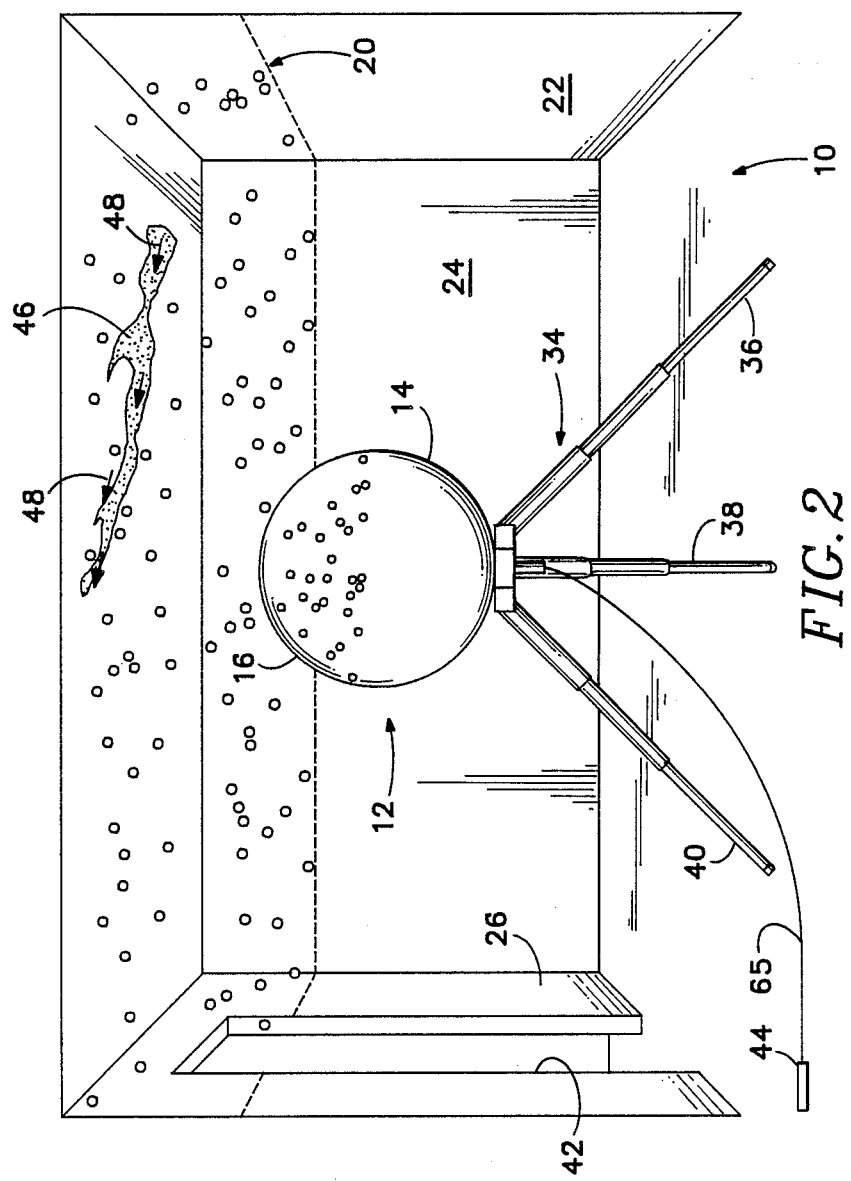

Referring to FIG. 2, also showing projector 12 in room 10, the light source within sphere 14 has been raised from its position in sphere 14 of FIG. 1, so that the pattern 20 is expanded to cover all of the ceiling 32 as well as upper portions of the walls 22, 24 and 26. As the light source is moved from the center of the sphere, the shape and relative size of each "constellation" of light spots projected by projector 12 changes by an amount depending on the position of the constellation in the sky. However such size distortion is not particularly noticeable or objectionable to the casual observer and the shape of each constellation is not substantially distorted over the range of light source positions required to adjust the pattern to suit most common room dimensions. The ability to expand or shrink the pattern 20 enables a workman to adjust the horizon of the night sky image to account for differences in room height. In a room with a low ceiling, the light source is adjusted to a higher vertical position than in a room with a high ceiling in order to produce the same apparent horizon. Similarly the light source must be raised as room floor dimensions increase.

Referring further to FIG. 2, the projector 12 includes a tripod 34 having independently adjustable legs 36, 38 and 40 on which sphere 14 is mounted. By adjusting legs 36, 38 and 40 to differing lengths, projector 12 can be tilted in any direction so that the image of the night sky can be rotated about the projector in any direction. Although tilting the projector 20 distorts the vertical orientation of the night sky image, rotating the image is nonetheless desirable when the point from which the night sky image is to be viewed (i.e., the position of the projector 12) is near a wall. If the image is not rotated away from the wall, a large part of the night sky would be compressed onto the wall behind the viewer and would normally not be seen. The projector 12 may also be rotated about a vertical axis simply by rotating tripod 34 in order to insure that light spots forming important constellations are not projected through doorways such as doorway 42 or onto mirrors, windows or other objects which cannot be painted.

The realism of the night sky image is enhanced by painting spots representing bright stars larger than spots representing dim stars, and the light spots to be painted larger may be identified by making the holes in projector 12 which produce them larger so that the light spots are larger. However there are a great many stars visible to the naked eye (about 2000 on a clear night) and it is impractical to position each star in the simulated night sky image using the projector. Accordingly only major (bright) stars forming important constellations are positioned by light spots using the projector 12 while small paint spots representing the dimmer, less important stars are randomly painted amongst the large spots representing the major stars after the large spots are positioned using the projector 12. When spots of different sizes are painted to represent stars of different brightness, the night sky image takes on a highly realistic three-dimensional effect.

Even when only the paint spots representing stars in the major constellations are accurately positioned using projector 12, a relatively large number of light spots must be projected and painted in order to mimic the major constellations of the night sky, and in the process of painting the light spots it is difficult for a workman to remember which light spots have been painted and which have not been painted. Phosphorescent paint often doesn't substantially change the intensity of the light emanating from the spot until the projector is turned off, particularly if the room is not very dark during the painting process. Therefore a foot switch 44 is inserted into a cord 65 supplying power to projector 12 so that the workman may turn the light source in the projector off and on. When the workman does this, the light spots which have not been painted "twinkle" (i.e., blink off and on) while the spots which have been painted shine continuously. The use of a foot switch 44 to control the projector light source is preferable to the use of a hand operated switch since the workman's hands are usually occupied.

In addition to stars, a number of "deep sky" objects including stellar nebulae, globular star clusters, and distant galaxies such as Andromeda are visible in the night sky, although these objects are not usually distinguishable from ordinary stars without using a telescope. Nonetheless, small representations of these deep sky objects may be painted in their proper locations on the inner surfaces of the room amongst the paint spots representing stars of the constellations in order to add interest to the simulated night sky image. For example, a star cluster may be represented by a cluster of very small paint spots resembling a single star from a distance, and a galaxy may be represented by a small painted spiral about the same size as a paint spot representing a major star. The positions of the deep sky objects are also identified by light spots from projector 12, but in order to distinguish these spots from spots representing ordinary stars, the holes in the projector may be shaped in the form of squares, triangles or other symbols so that the light spots representing deep sky objects differ in appearance from the light spots representing ordinary stars. Alternatively, the holes in projector 12 corresponding to deep sky objects may be covered with colored transparent film so that the light spots they produce have an identifying color.

Earth is located toward the outer edge of the Milky Way galaxy and from Earth the Milky Way may appear as a glowing, elongated cloud stretching across the night sky. With reference to FIG. 2, the appearance of the Milky Way is recreated in the image of the night sky by spraying an appropriately shaped cloud 46 of phosphorescent paint droplets on the ceiling of room 10 using an atomizer. The projector 12 marks the center line of the cloud 46 by projecting a line of light spots in the shape of arrows 48 (or other suitable symbols) onto the ceiling 32. The arrows are approximately created by cutting arrow-shaped holes into projector hemisphere 16 in the appropriate locations.

Figure 3:
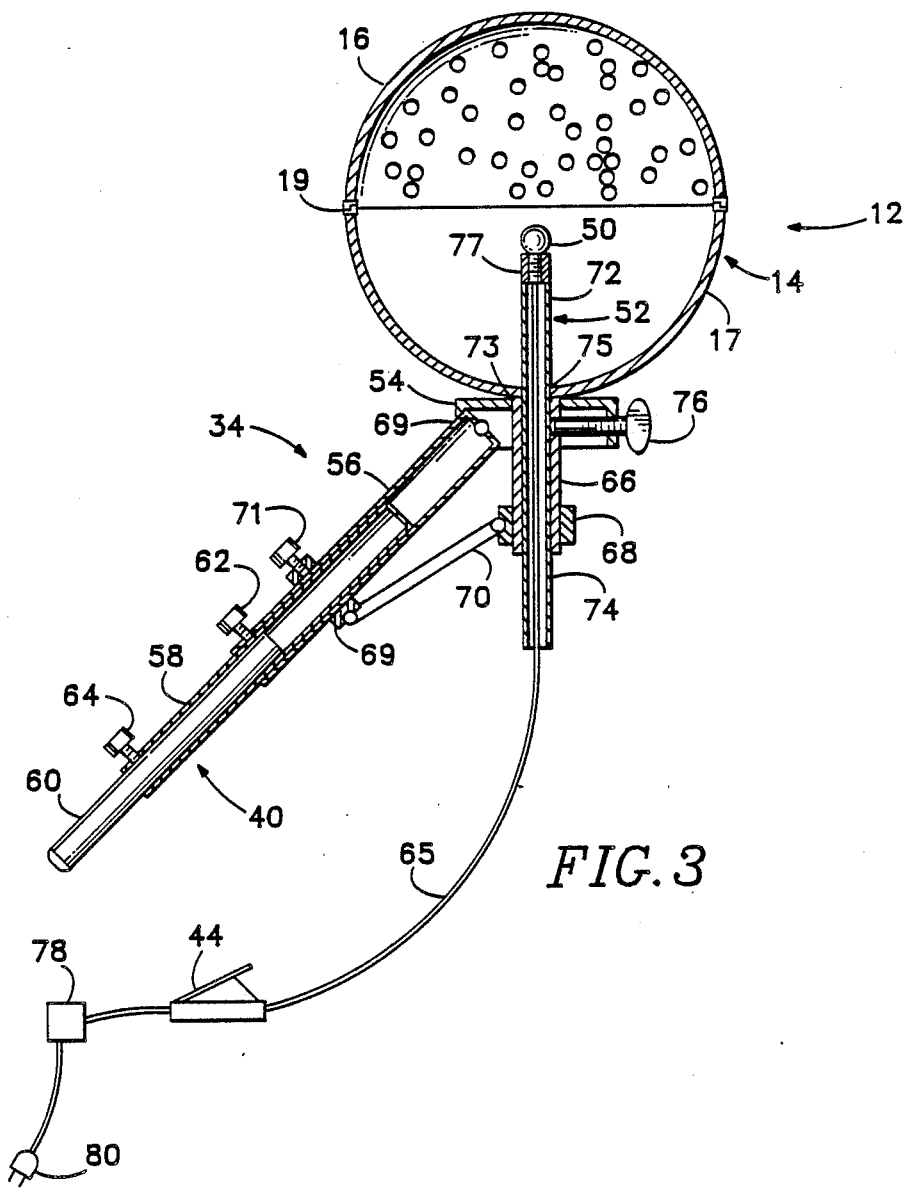
FIG. 3 is a sectional view of the projector of FIG. 1.

Referring to FIG. 3, showing in sectional elevation view the projector 12 of FIGS. 1 and 2, the projector includes perforated sphere 14, a small high intensity bulb 50, a bulb positioning assembly 52, and tripod 34. Only one leg 40 of tripod 34 is shown in detail but the other two legs are similar in construction. The sphere 14, suitably approximately 12 inches in diameter, includes upper and lower hemisphere sections 16 and 17 which are sleeved together at joint 19 such that the upper hemisphere 16 may be easily lifted from hemisphere 17 to provide access to bulb 50. The smallest holes drilled into upper hemisphere 16 are suitably 0.1 inch in diameter. While in the preferred embodiment of the invention bulb 50 is surrounded by a perforated container in the shape of a sphere, it should be appreciated that such container may have other shapes. For instance, the function of sphere 14 could be carried out by a perforated hollow cube. However it is easier to properly arrange the holes on a sphere than on any other shaped container and the distortion in the projected night sky image caused by moving lamp 50 up and down is typically not as great for a sphere as for other shapes.

Bulb 50 suitably comprises a 3.0 volt high intensity quartz halogen bulb preferably having a filament length not larger than the diameter of the smallest holes in hemisphere 16, about one-tenth inch. If a bulb having a large filament is utilized for light source, a light spot projected through a small hole will likely be larger and have fuzzy edges, making it difficult for a workman to determine how large the light spot really is. The light spot may also include an image of the bulb filament which is distracting to the workman.

The sphere 14 is secured to an upper platform 54 of tripod 34 to which its three legs are pinned. Leg 40 of tripod 34 includes three telescoping tubes 56, 58 and 60, the upper end 59 of tube 56 being pinned to platform 54. Middle tube 58 fits inside tube 56, and inner tube 60 fits inside tube 58. The position of tube 58 within tube 56 is set with a set screw 62 passing through tube 56 and engaging tube 58, while the position of tube 60 within tube 58 is fixed with another set screw 64 passing through tube 58 and engaging tube 60. The length of leg 40 may be adjusted by loosening set screws 62 and 64, sliding tubes 60 and 58 upward or downward as desired within tube 56, and then retightening set screws 62 and 64.

The upper end of vertical sleeve 66 is welded into a hole 73 in the center of platform 54 while a collar 68 is welded to the lower end of sleeve 66. Rod 70 is pinned at one end to collar 68 and at another end to a collar 69 surrounding tube 56. A set screw 71 passes through collar 69 and engages tube 56 for holding collar 69 in place on tube 56. Leg 40 of projector 12 may be rotated inwardly (toward sleeve 66) for compact storage by loosening set screw 71 and moving collar 69 downward.

Bulb positioning assembly 52 of projector 12 includes socket 77 for receiving bulb 50. Socket 77 is mounted on an upper end 72 of hollow cylindrical shaft 74 passing upward through sleeve 66 of tripod 34, through hole 73 in platform 54, through a hole 75 in the lower end of hemisphere 17, and into the interior of sphere 14. A set screw 76, passing through platform 54 of tripod 34 and threadably engaging sleeve 66 of tripod 34 bears against shaft 74 and normally keeps shaft 74 from sliding downwards. The position of bulb 50 along the vertical axis of sphere 14 may be adjusted by loosening set screw 76, moving shaft 74 up or down as desired, and then retightening set screw 76. Power is supplied to bulb 50 through cord 65 passing through the interior of shaft 74 from foot switch 44. Power is supplied by way of a 120 VAC/3.0 VDC transformer 78 driven from 110 VAC line via a wall plug 80.

Thus it is seen that the positioning of the phosphorescent paint spots representing stars or other night sky objects on the interior surfaces of a room is facilitated by the use of the projector 12 according to the present invention such that a relatively accurate representation of the night sky is seen from a selected point of view in the room. In addition, the construction of projector 12 permits the pattern of projected light spots to be expanded, contracted, rotated or tilted to suit the requirements of rooms having different sizes, shapes and unpaintable areas, without substantially distorting the shape and relative positioning of simulated stars and constellations seen by the viewer.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. Apparatus for projecting an adjustable pattern of light spots on interior surfaces of a substantially conventional room, so that the interior surfaces can be painted with spots of paint at the location of said light spots, said apparatus comprising:
    a light source;
    a container surrounding said light source, said container having a substantially vertical central axis and being perforated with apertures such that when said container is placed within the room, light from said light source passes through said apertures and creates a pattern of light spots on the interior surfaces of the room, said apertures being arranged such that said pattern of light spots resembles an arrangement of stars in a known stellar constellation;
    means for adjustably positioning said light source within said container to alter said pattern of light spots; and
    a stand supporting said container and having a plurality of legs of independently adjustable length such that said container can be tilted to adjustable position said pattern of light spots on the interior surfaces of the room,
    wherein said light source comprises a light bulb having a filament of length short enough so that said apertures are substantially as wide in shortest dimension as said filament length.

2. A method for simulating the appearance of a night sky in a room, the method comprising the steps of:
    projecting a first pattern of light spots on an interior surface of said room, said first pattern substantially resembling from at least one point of view in said room a simulation of the night sky; and
    painting said interior surface of said room with spots of paint at locations where said light spots are projected.

3. The method according to claim 2 further comprising the steps of:
    projecting a second pattern of light spots on said interior surface of said room, said second pattern of light spots representing a nebulous star pattern of the night sky; and
    spraying droplets of paint on said interior surface of said room to form a cloud like pattern of small paint spots positioned on said interior surface according to said second pattern of light spots.

4. The method according to claim 3 wherein the light spots of said second pattern are visually distinguishable from the light spots of said first pattern by a worker painting the spots or paint and spraying the droplets of paint on the interior surface of said room.

5. The method according to claim 2 further comprising the steps of:
    projecting an additional light spot on said interior surface of said room, said additional light spot being positioned with respect to said first pattern of light spots from said one point of view in said room so as to mimic the positioning of a known deep sky object; and
    painting a representation of said deep sky object on said interior surface of said room where said additional light spot is projected.

6. The method according to claim 5 wherein said projecting steps occur simultaneously, said additional light spot being visually distinguishable from the light spots of said first pattern.

7. The method according to claim 2 wherein the spots of paint corresponding with said first pattern of light spots substantially resemble at least a known stellar constellation.

8. The method according to claim 2 wherein said painting step includes the step of painting with phosphorescent paint.

9. The method according to claim 2 wherein said painting step includes the step of painting with fluorescent paint.

10. A method for simulating the appearance of a night sky in a darkened room, the method comprising the steps of:
    perforating a container with apertures;
    mounting a light source inside said container;
    placing said container in said darkened room such that light from said light source passes through said apertures and projects a pattern of light spots on an interior surface of said room, said pattern substantially resembling from at least one point of view in said darkened room a simulation of the night sky;
    painting said interior surface of said room with spots of paint at locations where said light spots are projected; and
    blinking the light source off and on during the painting step to determine at which of the light spots the spots of paint have been previously applied to the surface and at which other of the light spots no spots of paint have yet been applied, said paint comprising a material that glows in the dark after the light source turns off.

* * * * *

UNITED STATES PATENT AND TRADEMARK OFFICE
CERTIFICATE OF CORRECTION

PATENT NO. : 4,955,714

DATED : September 11, 1990

INVENTOR(S) : James G. Stotler; Dennis G. Lowe

It is certified that error appears in the above-identified patent and that said Letters Patent is hereby corrected as shown below:

Title page:
Abstract, line 5, delete "rooim" and insert --room--.

Column 4, line 1, after "pattern" insert --20--.

Column 8, line 10, after "spots" delete "or" and insert --of--.

Signed and Sealed this

Seventh Day of January, 1992

Attest:

HARRY F. MANBECK, JR.

*Attesting Officer*　　　　*Commissioner of Patents and Trademarks*